(12) United States Patent
Li et al.

(10) Patent No.: US 12,670,067 B2
(45) Date of Patent: Jun. 30, 2026

(54) DATA STORAGE METHOD AND APPARATUS IN STORAGE SYSTEM

(71) Applicant: Huawei Technologies Co., Ltd., Shenzhen (CN)

(72) Inventors: Linbo Li, Chengdu (CN); Jun Tang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/418,737

(22) Filed: Jan. 22, 2024

(65) Prior Publication Data

US 2024/0160528 A1      May 16, 2024

Related U.S. Application Data

(63) Continuation of application No. PCT/CN2022/080193, filed on Mar. 10, 2022.

(30) Foreign Application Priority Data

Jul. 22, 2021    (CN) ......................... 202110831638.X

(51) Int. Cl.
| | |
|---|---|
| *G06F 11/00* | (2006.01) |
| *G06F 3/06* | (2006.01) |
| *G06F 11/10* | (2006.01) |

(52) U.S. Cl.
CPC ........ *G06F 11/1076* (2013.01); *G06F 3/0619* (2013.01); *G06F 3/0647* (2013.01); *G06F 3/067* (2013.01)

(58) Field of Classification Search
CPC ............. G06F 11/1076; G06F 11/1096; G06F 3/0619; G06F 3/067
See application file for complete search history.

(56) References Cited

U.S. PATENT DOCUMENTS

| | | | | |
|---|---|---|---|---|
| 10,594,792 | B1 * | 3/2020 | Danilov | ................ G06F 3/0607 |
| 2018/0181475 | A1 * | 6/2018 | Danilov | .............. G06F 11/1076 |
| 2020/0250031 | A1 | 8/2020 | Li | |
| 2024/0160528 | A1 * | 5/2024 | Li | ........................... G06F 3/067 |

FOREIGN PATENT DOCUMENTS

| | | |
|---|---|---|
| CN | 109426590 A | 3/2019 |
| CN | 113918083 A | 1/2022 |

* cited by examiner

*Primary Examiner* — Philip Guyton
(74) *Attorney, Agent, or Firm* — Conley Rose, P.C.

(57)      ABSTRACT

A storage method includes: calculating M check blocks of N first data blocks based on a first erasure coding (EC) technology; respectively storing the N first data blocks and the M check blocks of the N first data blocks into (N+M) storage nodes in a storage system; updating the first EC technology to a second EC technology; calculating R check blocks of S second data blocks based on the second EC technology, where S is greater than N, a ratio of S to R is greater than a ratio of N to M, S, R, N, and M are all positive integers, and the second data block is a data block received after the first EC technology is updated to the second EC technology.

20 Claims, 7 Drawing Sheets

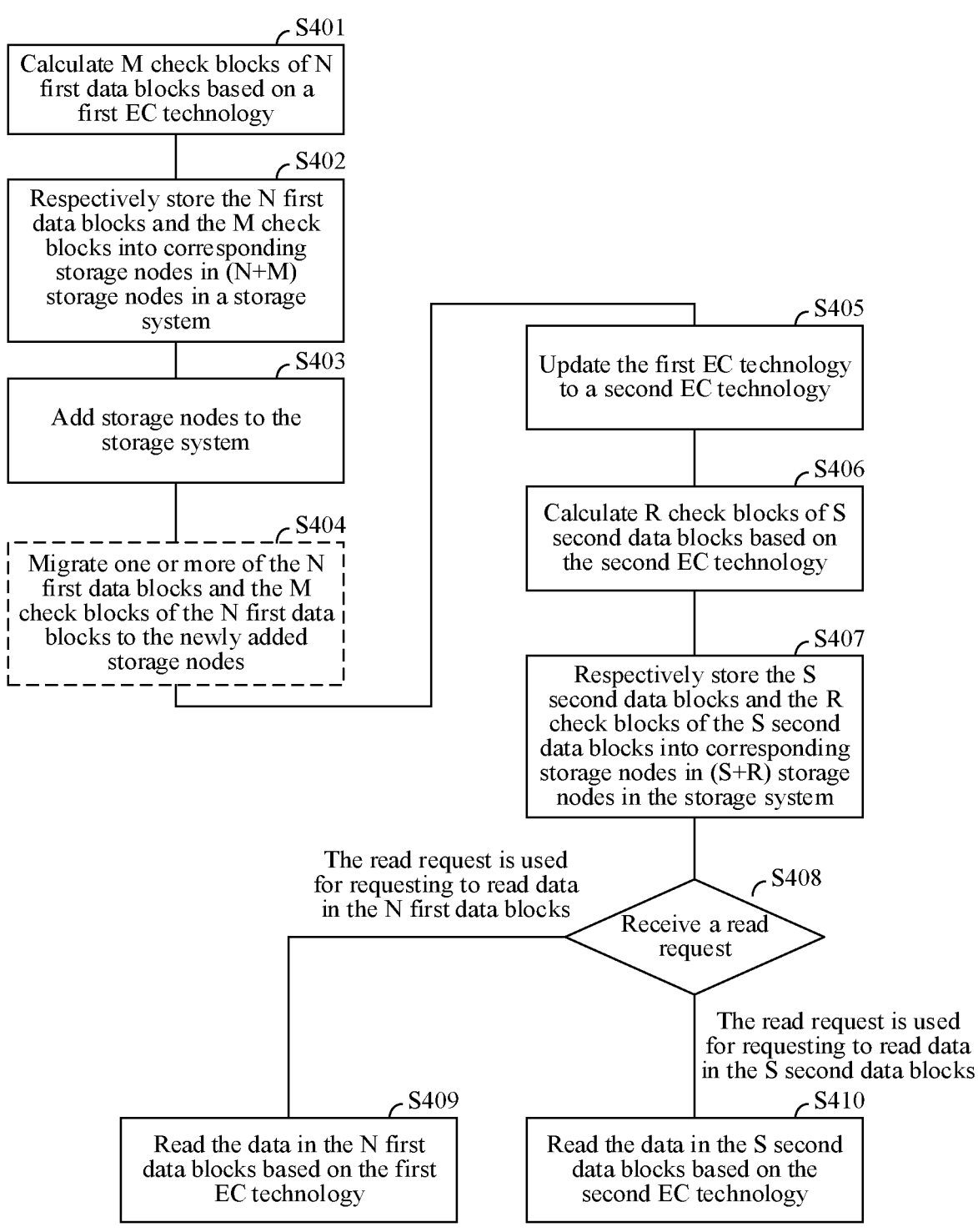

S401
Calculate M check blocks of N first data blocks based on a first EC technology S402
Respectively store the N first data blocks and the M check blocks into corresponding storage nodes in (N+M) storage nodes in a storage system S403
Add storage nodes to the storage system S404
Migrate one or more of the N first data blocks and the M check blocks of the N first data blocks to the newly added storage nodes S405
Update the first EC technology to a second EC technology S406
Calculate R check blocks of S second data blocks based on the second EC technology S407
Respectively store the S second data blocks and the R check blocks of the S second data blocks into corresponding storage nodes in (S+R) storage nodes in the storage system S408
Receive a read request The read request is used for requesting to read data in the N first data blocks The read request is used for requesting to read data in the S second data blocks S409
Read the data in the N first data blocks based on the first EC technology S410
Read the data in the S second data blocks based on the second EC technology

FIG. 6

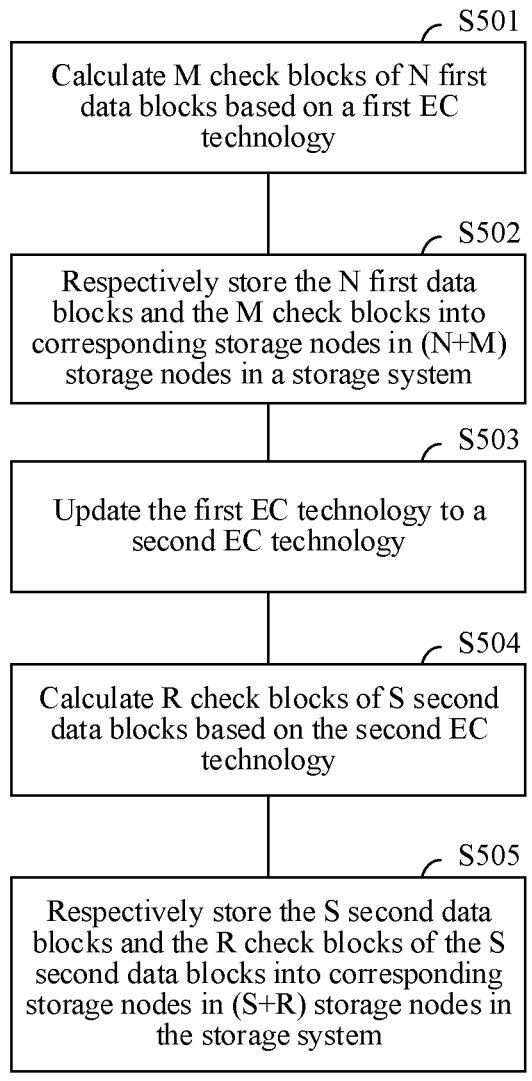

S501

Calculate M check blocks of N first data blocks based on a first EC technology

S502

Respectively store the N first data blocks and the M check blocks into corresponding storage nodes in (N+M) storage nodes in a storage system

S503

Update the first EC technology to a second EC technology

S504

Calculate R check blocks of S second data blocks based on the second EC technology

S505

Respectively store the S second data blocks and the R check blocks of the S second data blocks into corresponding storage nodes in (S+R) storage nodes in the storage system

FIG. 8

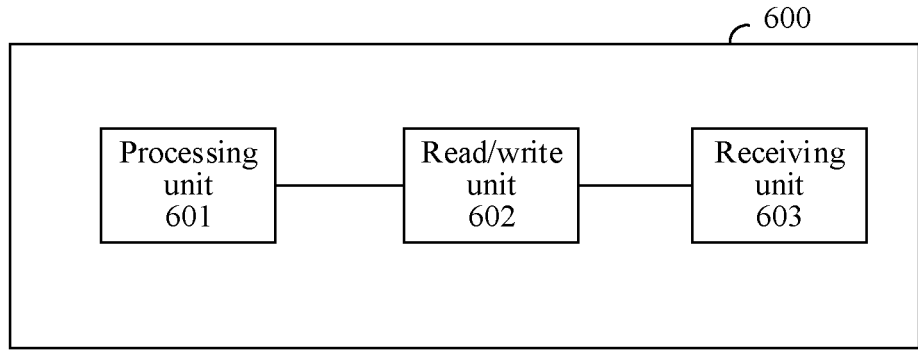

600

| Processing unit 601 | Read/write unit 602 | Receiving unit 603 |

FIG. 9

DATA STORAGE METHOD AND APPARATUS IN STORAGE SYSTEM

CROSS-REFERENCE TO RELATED APPLICATIONS

This is a continuation of International Patent Application No. PCT/CN2022/080193 filed on Mar. 10, 2022, which claims priority to Chinese Patent Application No. 202110831638.X filed on Jul. 22, 2021. The disclosures of the aforementioned applications are hereby incorporated by reference in their entireties.

TECHNICAL FIELD

This disclosure relates to the field of storage technologies, and in particular, to a data storage method and apparatus in a storage system.

BACKGROUND

Data reliability of a storage system may be improved through a data redundancy technology. At present, a commonly used data redundancy technology includes an erasure coding (EC) technology.

The EC technology refers to calculating Q check blocks of P data blocks and finally storing the P data blocks and the Q check blocks (collectively called (P+Q) blocks) in different storage locations of the storage system, respectively. When a quantity of damaged blocks in the (P+Q) blocks is less than Q, the damaged blocks may be recovered through undamaged blocks.

In a storage system using the EC technology, the storage system is configured with a redundancy ratio, and data is stored based on the redundancy ratio. However, as storage nodes in the storage system increase, the foregoing mechanism causes waste of storage resources.

SUMMARY

This disclosure provides a data storage method and apparatus in a storage system, to resolve a problem of waste of storage resources caused by an inappropriate redundancy ratio used by the storage system.

To achieve the foregoing objective, this disclosure uses the following technical solutions.

According to a first aspect, this disclosure provides a data storage method in a storage system. The method may be used in a storage system (for example, a centralized storage system or a distributed storage system). The method includes calculating M check blocks of N first data blocks based on a first EC technology, respectively storing the N first data blocks and the M check blocks of the N first data blocks into corresponding storage nodes in (N+M) storage nodes in the storage system, updating the first EC technology to a second EC technology, calculating R check blocks of S second data blocks based on the second EC technology, where S is greater than N, a ratio of S to R is greater than a ratio of N to M, S, R, N, and M are all positive integers, and the second data block is a data block received after the first EC technology is updated to the second EC technology, and respectively storing the S second data blocks and the R check blocks of the S second data blocks into corresponding storage nodes in (S+R) storage nodes in the storage system.

In the foregoing method in this disclosure, if an originally configured redundancy ratio is not suitable for a current storage system due to capacity expansion of the storage system, an EC technology of the storage system may be updated, so that a ratio and a quantity of data blocks in a newly used EC technology (that is, the second EC technology) are both greater than a ratio and a quantity of data blocks in an originally used EC technology (that is, the first EC technology) (that is, a ratio of S to R is greater than a ratio of N to M, and S is greater than N), so that capacity utilization of the storage system is improved, and waste of storage resources of the storage system is avoided.

In a possible implementation, the method further includes selecting S target data blocks from data blocks stored in the storage system based on the first EC technology, and calculating R check blocks of the S target data blocks based on the second EC technology, and respectively storing the S target data blocks and the R check blocks of the S target data blocks into corresponding storage nodes in the storage system. In the foregoing implementation, after the first EC technology is updated to the second EC technology, data that uses the original redundancy ratio EC N+M in the storage system may be converted into data that uses the new redundancy ratio EC S+R at a proper time (for example, in an idle time period of the storage system), so that capacity utilization of the storage system is further improved. In addition, during capacity expansion of the storage system, a structure of previous data in the storage system may not be changed first, but the EC N+M data in the storage system is converted into the EC S+R data in a subsequent proper time period (for example, in an idle time period of the storage system), so that a capacity expansion time of the storage system can be shortened.

In a possible implementation, R is not less than M. In this implementation, the quantity R of check blocks in the redundancy ratio of the second EC technology is not less than the quantity M of check blocks in the first EC technology, so that reliability of stored data is ensured.

In a possible implementation, the method further includes receiving a read request. If the read request is used for requesting to read data in the N first data blocks, the data in the N first data blocks is read based on the first EC technology. If the read request is used for requesting to read data in the S second data blocks, reading the data, data in the S second data blocks is read based on the second EC technology. In this implementation, after the read request is received, different EC technologies may be used for reading data based on different data that the read request requests to read.

In a possible implementation, before updating the first EC technology to a second EC technology, the method further includes adding storage nodes to the storage system. In the foregoing implementation, according to the method provided in embodiments of this disclosure, if storage nodes are added to the storage system, capacity utilization of the storage system can be improved, and waste of storage resources can be avoided.

In a possible implementation, the method further includes migrating one or more of the N first data blocks and the M check blocks of the N first data blocks to the newly added storage nodes. In the foregoing implementation, after the storage system is expanded, some or all data in original storage nodes may be migrated to the newly added storage nodes, so that load of the original storage nodes is reduced, thereby balancing load of the entire storage system.

In a possible implementation, the storage node is any one of a hard disk, a disk enclosure, or a storage server.

According to a second aspect, this disclosure provides a data storage apparatus, including a processing unit configured to calculate M check blocks of N first data blocks based on a first EC technology, and a read/write unit configured to respectively store the N first data blocks and the M check blocks of the N first data blocks into corresponding storage nodes in (N+M) storage nodes in a storage system. The processing unit is further configured to update the first EC technology to a second EC technology. The processing unit is further configured to calculate R check blocks of S second data blocks based on the second EC technology, where S is greater than N, a ratio of S to R is greater than a ratio of N to M, S, R, N, and M are all positive integers, and the second data block is a data block received after the first EC technology is updated to the second EC technology. The read/write unit is configured to respectively store the S second data blocks and the R check blocks of the S second data blocks into corresponding storage nodes in (S+R) storage nodes in the storage system.

In a possible implementation, the processing unit is further configured to select, in an idle time period of the storage system, S target data blocks from data blocks stored in the storage system based on the first EC technology, and calculate R check blocks of the S target data blocks based on the second EC technology. The read/write unit is further configured to respectively store the S target data blocks and the R check blocks of the S target data blocks into corresponding storage nodes in the storage system.

In a possible implementation, R is not less than M.

In a possible implementation, the data storage apparatus further includes a receiving unit configured to receive a read request. The read/write unit is configured to read, if the read request is used for requesting to read data in the N first data blocks, the data in the N first data blocks based on the first EC technology.

The read/write unit is further configured to read, if the read request is used for requesting to read data in the S second data blocks, reading the data, data in the S second data blocks based on the second EC technology.

In a possible implementation, the processing unit is further configured to add storage nodes to the storage system before updating the first EC technology to the second EC technology.

In a possible implementation, after the storage nodes are added to the storage system, the read/write unit is further configured to migrate one or more of the N first data blocks and the M check blocks of the N first data blocks to the newly added storage nodes.

In a possible implementation, the storage node is any one of a hard disk, a disk enclosure, or a storage server.

According to a third aspect, this disclosure provides a data storage apparatus, including a processor and an interface circuit. The processor receives or sends data through the interface circuit, and the processor is configured to implement the method according to any one of the first aspect, or the implementations of the first aspect through a logic circuit or by executing code instructions.

According to a fourth aspect, this disclosure provides a storage system, including the data storage apparatus according to any one of the second aspect, the implementations of the second aspect, or the third aspect.

According to a fifth aspect, this disclosure provides a computer-readable storage medium. The storage medium stores a computer program. When the computer program is executed by a processor, the method according to any one of the first aspect, or the implementations of the first aspect is implemented.

According to a sixth aspect, this disclosure provides a computer program product. The computer program product includes instructions. When the instructions are run on a processor, the method according to any one of the first aspect, or the implementations of the first aspect is implemented.

BRIEF DESCRIPTION OF DRAWINGS

FIG. 6 is a schematic flowchart of a data storage method according to an embodiment of this disclosure;

FIG. 8 is a schematic flowchart of a data storage method according to an embodiment of this disclosure; and FIG. 9 is a schematic diagram of a structure of a data storage apparatus according to an embodiment of this disclosure.

DESCRIPTION OF EMBODIMENTS

The following describes technical solutions in embodiments of this disclosure with reference to the accompanying drawings in embodiments of this disclosure. To clearly describe the technical solutions in embodiments of this disclosure, terms such as "first" and "second" are used in embodiments of this disclosure to distinguish between same items or similar items that have basically the same functions or purposes. A person skilled in the art may understand that the terms such as "first" and "second" do not limit a quantity or an execution sequence, and the terms such as "first" and "second" do not indicate a definite difference. In addition, in embodiments of this disclosure, the terms such as "example" or "for example" is used to represent giving an example, an illustration, or a description. Any embodiment or design scheme described as an "example" or "for example" in embodiments of this disclosure should not be explained as being more preferred or having more advantages than another embodiment or design scheme. Exactly, use of the terms such as "example" or "for example" is intended to present a relative concept in a specific manner for ease of understanding.

An application scenario of the technical solutions provided in embodiments of this disclosure is first described. Further, the technical solutions provided in embodiments of this disclosure may be applied to storage systems of various frameworks.

Figure 1:
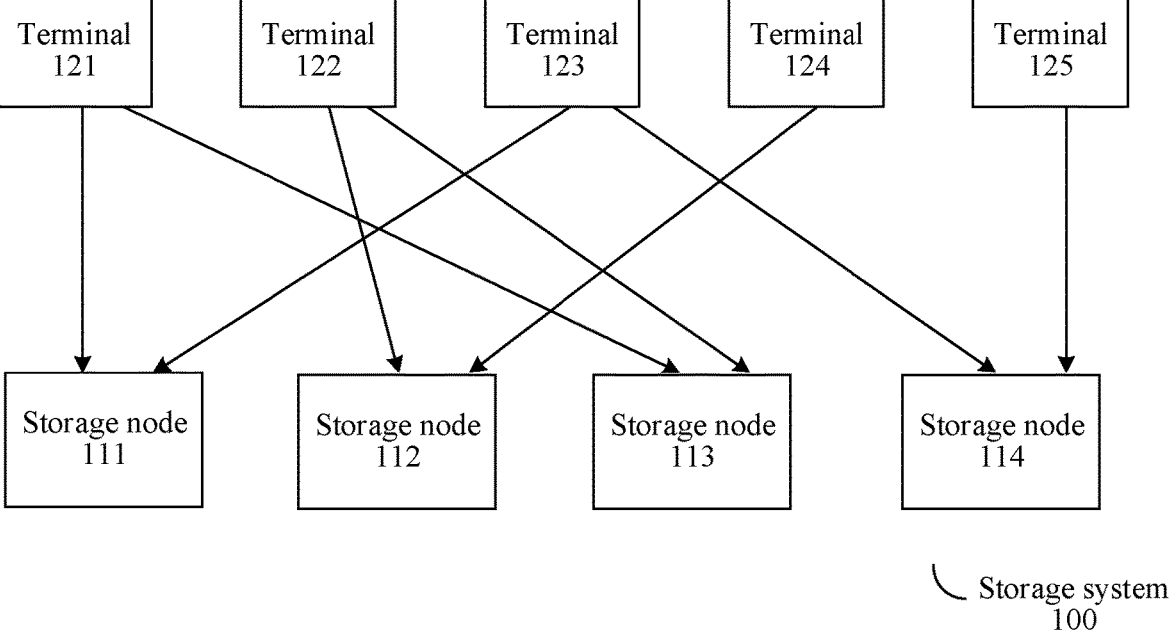
FIG. 1 is a schematic diagram of a structure of a storage system according to an embodiment of this disclosure.

For example, FIG. 1 is a schematic diagram of a storage system 100 according to an embodiment of this disclosure. The storage system 100 may be understood as a storage system in which data is stored on a plurality of independent storage nodes. A terminal 121 to a terminal 125 in FIG. 1 may write data into a storage system or read data from a storage system. A storage node 111 to a storage node 114 are used for storing data.

Figure 2:
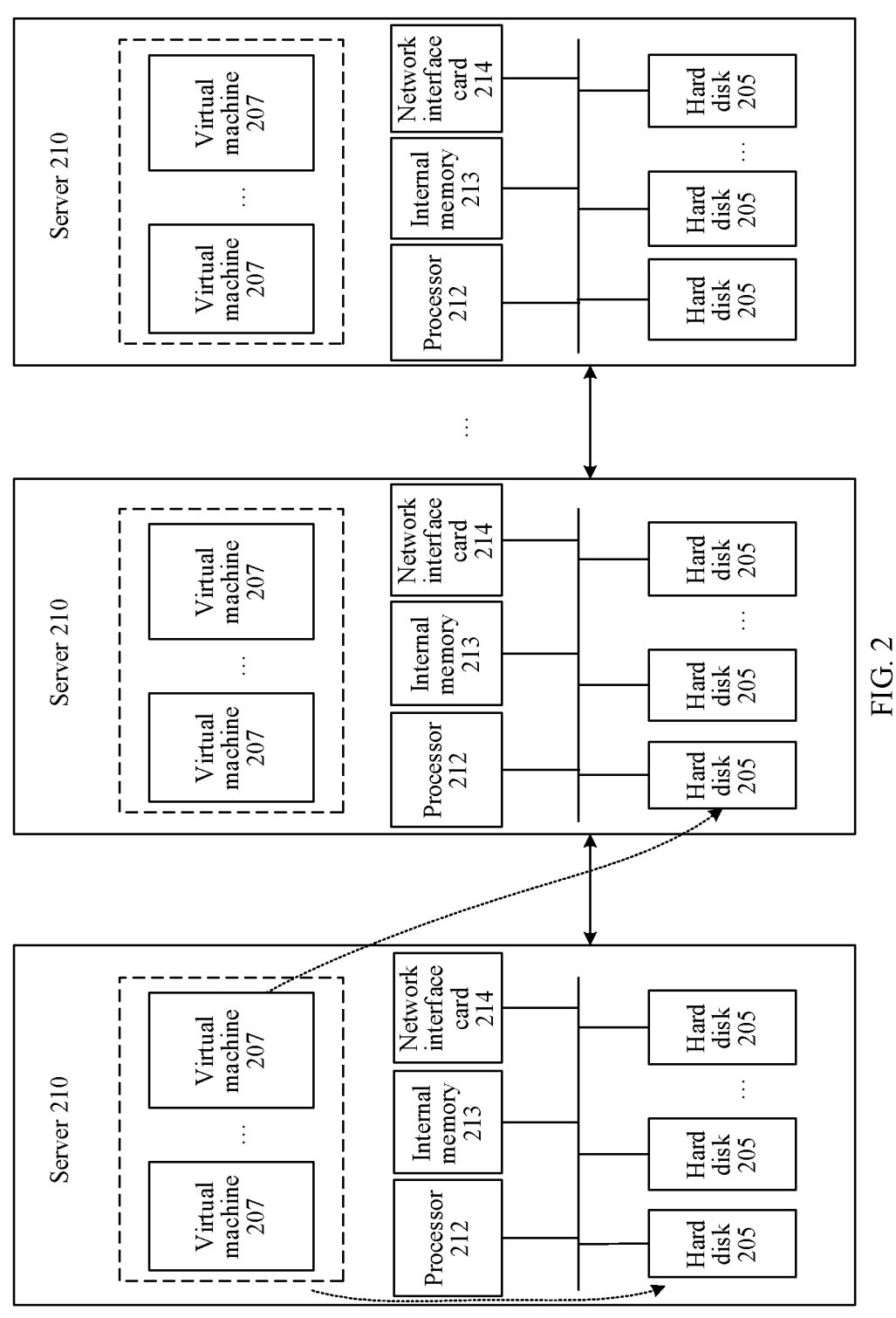
FIG. 2 is a schematic diagram of a structure of a storage system according to an embodiment of this disclosure.

In a possible design, the storage node 111 to the storage node 114 in FIG. 1 may be independent servers, respectively. FIG. 2 is a schematic diagram of a distributed storage system. The distributed storage system includes one or more servers 210 (FIG. 2 shows an example of three servers 210), and the servers 210 may communicate with each other. The server 210 is a device that has both a computing capability and a storage capability, for example, a server or a desktop computer. In terms of software, each server 210 has an operating system. A virtual machine 207 may be created on the server 210. A computing resource required by the virtual machine 207 is from a local processor 212 and a local memory (or internal memory) 213 of the server 210, and a storage resource required by the virtual machine 207 may be from a local hard disk 205 of the server 210, or may be from a hard disk 205 in another server 210. In addition, various application programs may run in the virtual machine 207, and a user may trigger a data read/write request through the application program in the virtual machine 207. The virtual machine 207 accesses the distributed storage system as a client.

In terms of hardware, as shown in FIG. 2, the server 210 includes at least a processor 212, an internal memory 213, a network interface card 214, and hard disks 205. The processor 212, the internal memory 213, the network interface card 214, and the hard disks 205 are connected through a bus. The processor 212 and the internal memory 213 are configured to provide a computing resource. Further, the processor 212 is a central processing unit (CPU), and is configured to process a data access request from outside of the server 210 or a request generated inside the server 210. For example, when receiving data write requests sent by a terminal, the processor 212 temporarily stores data in the data write requests in the internal memory 213. When a total amount of data in the internal memory 213 reaches a specific threshold, the processor 212 sends the data stored in the internal memory 213 to the hard disk 205 for persistent storage. In addition, the processor 212 is further configured to perform calculation or processing on data, for example, metadata management, deduplication, data compression, data verification, storage space virtualization, and address translation. FIG. 2 shows only one CPU 212. In actual application, there are generally a plurality of CPUs 212, and one CPU 212 has one or more CPU cores. A quantity of CPUs and a quantity of CPU cores are not limited in this embodiment.

The internal memory 213 is an internal memory that directly exchanges data with the processor. The internal memory 213 can read and write data at a fast speed at any time, and serves as a temporary data memory of an operating system or another running program. The internal memory includes at least two types of memories. For example, the internal memory may be a random-access memory (RAM), or may be a read-only memory (ROM). For example, the RAM is a dynamic RAM (DRAM), or a storage class memory (SCM). The DRAM is a semiconductor memory, and is a volatile memory device like most RAMs. The SCM is a composite storage technology that combines features of both a conventional storage apparatus and a memory. A storage class memory can provide a faster read/write speed than a hard disk, but is slower than a DRAM in terms of an access speed and is cheaper than a DRAM in terms of costs. However, the DRAM and the SCM are merely examples for description in this embodiment. The internal memory may further include another RAM, for example, a static RAM (SRAM). The read-only memory (ROM), for example, may be a programmable ROM (PROM) or an erasable PROM (EPROM). In addition, the internal memory 213 may alternatively be a dual in-line memory module (DIMM), that is, a module formed by a DRAM, or may be a solid-state drive (SSD). In actual application, a plurality of internal memories 213 and different types of internal memories 213 may be configured in the server 210. A quantity and a type of the internal memory 213 are not limited in this embodiment. In addition, the memory 213 may be configured to have a power-off protection function. The power-off protection function means that data stored in the internal memory 213 is not lost when a system is powered on again after being powered off. An internal memory with a power-off protection function is referred to as a non-volatile memory.

The hard disk 205 is configured to provide a storage resource, for example, storage data, and may be a magnetic disk or another type of storage medium, for example, an SSD or a shingled magnetic recording drive. The network interface card 214 is configured to communicate with another application server 210.

FIG. 2 merely provides an example of a framework of a distributed storage system. In some other possible designs, the distributed storage system may also use another framework. For example, a virtual machine may not be created on the server 210, and the server 210 uses a local computing resource (such as a processor and an internal memory) and a local storage resource (such as a hard disk) to complete a data read/write request. For another example, the distributed storage system may include a computing node cluster and a storage node cluster. The computing node cluster includes one or more computing nodes, and the computing nodes may communicate with each other. Each computing node is a computing device, such as a server, a desktop computer, or a controller of a storage array. Each computing node may communicate with any storage node in the storage node cluster through a network, and is configured to write data into a hard disk in the storage node or read data on a hard disk in the storage node.

In addition, for ease of understanding of the technical solutions provided in embodiments of this disclosure, the foregoing mainly uses the distributed storage system as an example to describe an application scenario of embodiments of this disclosure. However, it should be noted that the foregoing related descriptions of the distributed storage system are not intended to be construed as a limitation on a framework of a storage system to which this disclosure is applied. For example, in some other application scenarios, embodiments of this disclosure may also be applied to a centralized storage system. Further, different from the distributed storage system, the centralized storage system may be understood as a central node formed by one or more main devices, data is centrally stored in the central node, and data processing services of the entire system are centrally deployed on the central node. In other words, a framework structure of a storage system to which the technical solutions provided in embodiments of this disclosure are applied is not limited in embodiments of this disclosure.

At present, data reliability of a storage system may be ensured through a data redundancy technology, where a common data redundancy technology includes an EC technology. The EC technology refers to calculating Q check blocks (or check columns) of P data blocks (or data columns) and finally storing the P data blocks and the Q check blocks (collectively called (P+Q) blocks) in different storage locations of the storage system, respectively. For example, in a distributed storage system, the (P+Q) blocks are respectively stored in different storage servers. When a quantity of damaged blocks in the (P+Q) blocks is less than Q, the damaged blocks may be recovered through undamaged blocks. For brevity of description, in the following, the quantity P of data blocks and the quantity Q of check blocks in the EC technology may be referred to as a redundancy ratio, represented as EC P+Q.

In a storage system that uses the EC technology, the EC technology used by the storage system is generally configured when the storage system is created, that is, the redundancy ratio EC P+Q is configured. Then, the system stores data based on the redundancy ratio. However, as storage nodes in the storage system increase, if an original redundancy ratio is still used, waste of storage resources is caused.

For example, when a storage system is created, the storage system includes six storage nodes. In this case, a redundancy ratio of EC 4+2 is used for data storage, and capacity utilization of the storage system is about 66.7% (that is, 4/(4+2)×100%). After storage nodes are added, for example, the storage nodes are added to 10, if the redundancy ratio of EC 4+2 is still used for data storage, waste of storage resources is caused. In this case, a redundancy ratio with a larger proportion of data blocks may be used, to improve capacity utilization while satisfying a data reliability constraint condition.

To resolve the foregoing problem, the following three technical solutions are proposed in a Related Technology to Complete Capacity Expansion of a Storage System.

First Technical Solution:

A new storage system is created based on a redundancy ratio with higher capacity utilization, data is migrated from an original storage system to a new storage system, service switching is completed, and hardware of the original storage system is added to the new storage system.

For example, if the original storage system includes six storage nodes, the redundancy ratio of EC 4+2 is used for data storage. If the storage system needs to be expanded to 10 storage nodes, the 10 newly added storage nodes are used for creating a new storage system based on a redundancy ratio (for example, EC 8+2) with higher capacity utilization. Then, data in the original storage system is migrated to the new storage system based on the new redundancy ratio of EC 8+2 and service switching is completed. Then, six storage nodes of the original storage system may be added to the new storage system to further expand the capacity of the storage system.

It can be learned that, the foregoing technical solution can achieve effect of improving capacity utilization when a storage system is expanded. However, in an aspect, in this technical solution, there is a relatively high requirement on a quantity of newly added hardware for capacity expansion. For example, in the foregoing example, if a quantity of storage nodes for capacity expansion is less than 6, the foregoing technical solution cannot be implemented. In another aspect, in this solution, data migration and service switching between storage systems need to be performed in a capacity expansion process, and an operation and maintenance operation is complex, and capacity expansion takes a long time, consumes large resources, and is not user-friendly. Especially for a storage system that requires continuous capacity expansion, operation and maintenance costs and operation risks are higher.

Second Technical Solution:

Data in a storage system is temporarily stored in specific storage space (for example, the storage space may be another storage system), hardware of the original storage system and hardware of newly added storage nodes are used for creating a new storage system based on a redundancy ratio with higher capacity utilization, the temporarily stored data is migrated to the new storage system, and service switching is completed.

It can be learned that, the foregoing technical solution can achieve effect of improving capacity utilization when a storage system is expanded. However, in an aspect, in this technical solution, more additional storage space needs to be provided for temporarily storing the data of the original storage system. As a storage system scale expands, the storage space for temporary storage is also larger. In another aspect, in this solution, data migration and service switching between storage systems need to be performed in a capacity expansion process, and an operation and maintenance operation is complex, and capacity expansion takes a long time, consumes large resources, and is not user-friendly. Especially for a storage system that requires continuous capacity expansion, operation and maintenance costs and operation risks are higher.

Third Technical Solution:

When a storage system is created initially, a redundancy ratio with a larger quantity of data blocks and check blocks is used for creating the storage system. For example, when a storage system including two storage nodes is created, generally, a redundancy ratio of EC 1+1 may be used, so that data reliability is ensured. However, in this technical solution, a redundancy ratio with a larger quantity of data blocks and check blocks may be used, for example, EC 10+10.

Then, when the storage system is expanded, a quantity of check blocks in the redundancy ratio in the storage system is reduced. Still continuing the foregoing example, when storage nodes are added to three, as shown in Table 1, check blocks of data blocks stored in the storage system are calculated based on a redundancy ratio of EC 10+5, that is, five check blocks of every 10 data blocks, and then the 10 data blocks and the five check blocks are respectively stored in the three storage nodes. For another example, when storage nodes are added to four, as shown in Table 1, check blocks of data blocks stored in the storage system are calculated based on a redundancy ratio of EC 10+4, that is, four check blocks of 10 data blocks in the storage system are calculated, and then the 10 data blocks and the four check blocks are respectively stored in the four storage nodes.

TABLE 1

| Quantity of storage nodes | Redundancy ratio | Capacity utilization |
|---|---|---|
| 2 | 10 + 10 | 50.0% |
| 3 | 10 + 5 | 66.7% |
| 4 | 10 + 4 | 71.4% |
| 5 | 10 + 3 | 76.9% |
| 6 | 10 + 2 | 83.3% |

It can be learned that, the foregoing technical solution can achieve effect of improving capacity utilization when a storage system is expanded. However, in this technical solution, when a storage system is created, a redundancy ratio with a larger quantity of data blocks and check blocks needs to be configured. In addition, in a continuous capacity expansion scenario, a quantity of check blocks in the redundancy ratio has a reduction lower limit. For example, in the example shown in Table 1, after EC 10+2, the quantity of check blocks cannot be further reduced due to a reliability constraint.

To resolve the foregoing technical problem, the EC technology of the storage system may be updated first to change the redundancy ratio, for example, EC N+M is changed to EC S+R, so that newly stored data is stored based on a redundancy ratio with a larger quantity of data blocks and a larger proportion (that is, S is greater than N, and a ratio of S to R is greater than a ratio of N to M), thereby improving capacity utilization. Further, because converting data that uses the original redundancy ratio EC N+M in the storage system into data that uses the new redundancy ratio EC S+R takes a long time and occupies a relatively large quantity of resources, in this embodiment of this disclosure, when the redundancy ratio of the storage system is updated, a structure of the existing EC N+M data may not be changed first, but the EC N+M data in the storage system is converted into the EC S+R data in a subsequent idle period of the storage system, thereby shortening a time for updating the redundancy ratio of the storage system.

The following describes the technical solutions provided in embodiments of this disclosure with reference to the accompanying drawings.

Figure 3:
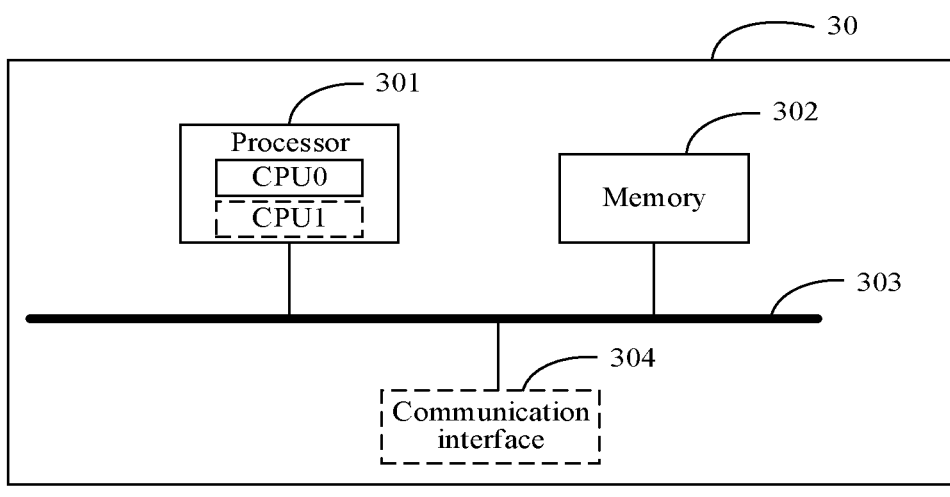
FIG. 3 is a schematic diagram of a structure of a data storage apparatus according to an embodiment of this disclosure.

An embodiment of this disclosure provides a data storage method in a storage system. During specific implementation, the method may be implemented by a data storage apparatus 30 shown in FIG. 3.

The data storage apparatus 30 includes at least one processor 301 and a memory 302. In addition, the data storage apparatus 30 may further include a communication line 303 and a communication interface 304.

The processor 301 is configured to execute computer-executable instructions in the memory 302, to implement the data storage method provided in this disclosure.

Further, the processor 301 may be a general-purpose CPU, a microprocessor, an application-specific integrated circuit (ASIC), or one or more integrated circuits configured to control the execution of the solution procedure of this disclosure.

The memory 302 may be a ROM or another type of static storage device capable of storing static information and instructions, a RAM or another type of dynamic storage device capable of storing information and instructions, or may be an electrically EPROM (EEPROM), a compact disc (CD) ROM (CD-ROM) or another optical disc storage, an optical disc storage (including a compact disc, a laser disc, an optical disc, a DIGITAL VERSATILE DISC (DVD), a BLU-RAY disc, and the like), a magnetic disk storage medium or another magnetic storage device, or any other medium that can be used for carrying or storing program code in a form of instructions or a data structure and that can be accessed by a computer, but is not limited thereto. The memory 302 may exist independently, and is connected to the processor through the communication line 303. Alternatively, the memory 302 may be integrated with the processor 301.

The communication line 303 may include a data bus configured to transmit information between the foregoing components.

The communication interface 304 is configured to communicate with another apparatus. For example, the data storage apparatus 30 may communicate with another hardware device in the storage system through the communication interface 304, to perform the data storage method in embodiments of this disclosure.

In an actual application process, the data storage apparatus 30 may be a hardware apparatus configured to manage and control the storage system, in the storage system. For example, the data storage apparatus may be a storage server that has a management and control function in the distributed storage system shown in FIG. 2 or some hardware inside a storage server. For another example, the data storage apparatus may be a storage engine in a centralized storage system or some hardware inside a storage engine.

Figure 4:
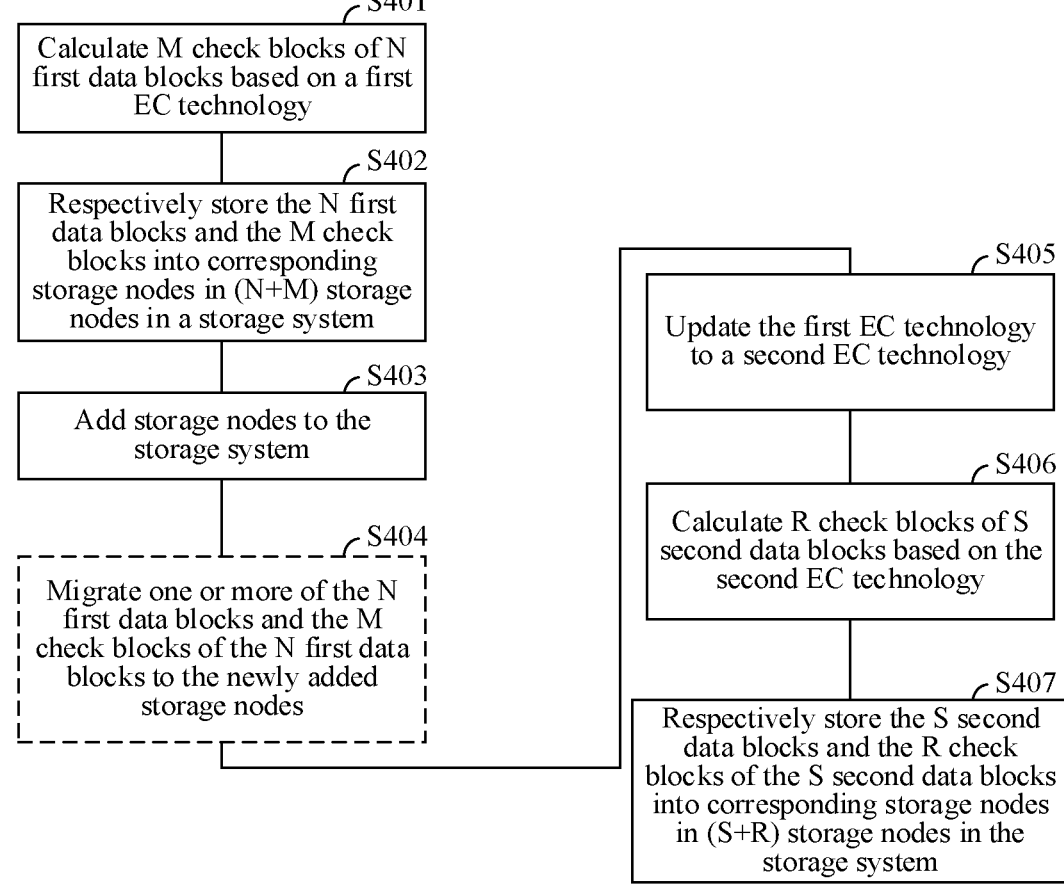
FIG. 4 is a schematic flowchart of a data storage method according to an embodiment of this disclosure.

The following describes the method by using a scenario in which a storage system is expanded as an example. As shown in FIG. 4, the method includes the following steps.

S401. A data storage apparatus calculates M check blocks of N first data blocks based on a first EC technology.

The N first data blocks may be N data blocks in to-be-stored data received by a storage system after the first EC technology is configured for the storage system.

Further, after the first EC technology is configured for the storage system, the storage system may temporarily store the received to-be-stored data. For example, the data is temporarily stored in an internal memory of a storage node (which may be a storage node in which the data storage apparatus is located) in the storage system. Then, when an amount of the temporarily stored data reaches a threshold, the data storage apparatus evenly divides the temporarily stored data into N data blocks (for example, the foregoing N first data blocks), and calculates M check blocks of the N data blocks.

It should be noted that in this embodiment of this disclosure, the first EC technology may be understood as an EC technology in which check blocks of data blocks are calculated based on a preconfigured redundancy ratio (that is, N data blocks correspond to M check blocks, EC N+M) corresponding to the first EC technology. When the check blocks of the data blocks are calculated by using the first EC technology, a redundancy relationship in which the N data blocks correspond to the M check blocks is generally used for performing data redundancy. However, in some cases, for example, if a specific storage node in the storage system is faulty, when the check blocks of the data blocks are calculated by using the first EC technology with a redundancy ratio of EC N+M, data redundancy processing may alternatively be performed based on a redundancy relationship with fewer data blocks (for example, (N−1) data blocks correspond to M check blocks, or (N−2) data blocks correspond to M check blocks). However, due to constraint of the redundancy ratio EC N+M, data redundancy processing is not performed based on a redundancy relationship with more data blocks (for example, (N+1) data blocks correspond to M check blocks, or (N+2) data blocks correspond to M check blocks).

S402. The data storage apparatus respectively stores the N first data blocks and the M check blocks into corresponding storage nodes in (N+M) storage nodes in the storage system.

For example, the storage system currently includes six storage nodes, and a redundancy ratio corresponding to the first EC technology is EC 4+2. The data storage apparatus evenly divides the to-be-stored data into four first data blocks, and calculates two check blocks of the four first data blocks. Then, the four first data blocks and the two check blocks are respectively stored in different storage nodes in the six storage nodes.

It should be noted that, when the method provided in embodiments of this disclosure is applied to a distributed storage system, a storage node in the method may be a storage server, a hard disk, or a disk enclosure that implements a function of a storage node in a distributed system. When the method provided in embodiments of this disclosure is applied to a centralized storage system, a storage node in the method may be one or more hard disks, disk enclosures, or the like, respectively.

S403. The data storage apparatus adds storage nodes to the storage system.

Further, in a process of using the storage system, when storage space of the storage system is insufficient, the storage system may be expanded by adding the storage nodes (for example, a storage server, a disk enclosure, or a hard disk). For example, after a storage server, a disk enclosure, or a hard disk to be added is powered on and connected to a network in which the storage system is located, the operation and maintenance personnel selects the storage server, the disk enclosure, or the hard disk to be added on an operation interface, and triggers the data storage apparatus to add the storage server, the disk enclosure, or the hard disk to the storage system, so as to add the storage nodes to the storage system.

S404. The data storage apparatus migrates one or more of the N first data blocks and the M check blocks of the N first data blocks to the newly added storage nodes.

Further, after the storage nodes are added to the storage system, compared with original storage nodes in the storage system, the newly added storage nodes have larger free storage space. Therefore, some data stored in the original storage nodes may be migrated to the newly added storage nodes. Further, at least some first data blocks or check blocks in the N first data blocks and the M check blocks of the N first data blocks may be migrated to the newly added storage nodes, so that data is evenly distributed among storage nodes and loads of the storage nodes are balanced.

Figure 5:
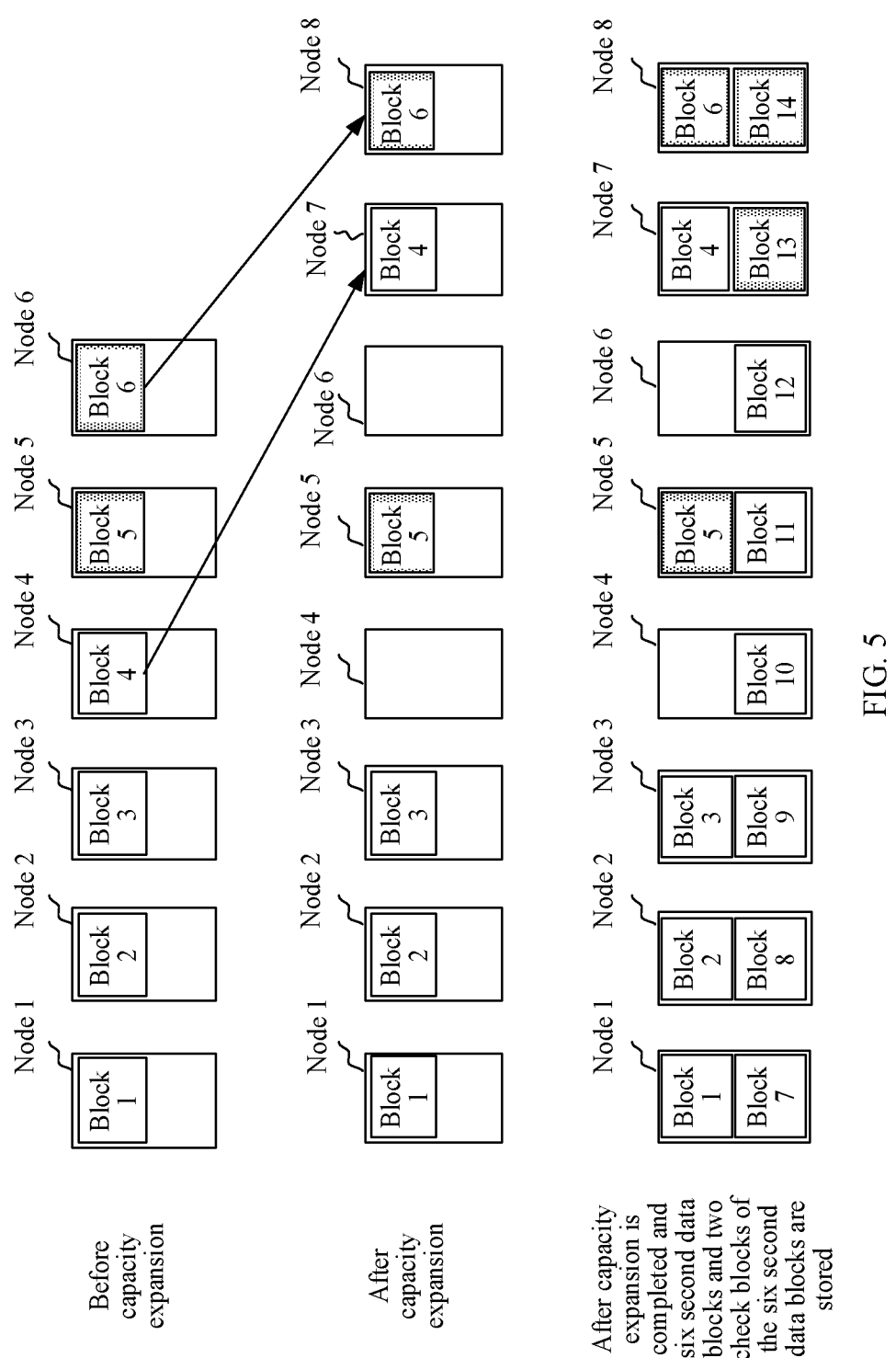
FIG. 5 is a schematic flowchart of a data storage method according to an embodiment of this disclosure.

For example, using four first data blocks and two check blocks of the four first data blocks as an example, as shown in FIG. 5, before expansion, the four first data blocks (for example, a block 1 to a block 4 in the figure) are respectively stored in a node 1 to a node 4, and the two check blocks (for example, a block 5 and a block 6 in the figure) are respectively stored in a node 5 and a node 6 (for example, as shown in shadows in the figure). After expansion, the first data block (that is, the block 4) in the node 4 may be migrated to a node 7. The check block (that is, the block 6) in the node 6 is migrated to a node 8, so that loads of the node 4 and the node 6 are reduced.

It should be noted that in a specific implementation process, to simplify a capacity expansion process of the storage system, content of S404 may not be performed.

S405. The data storage apparatus updates the first EC technology to a second EC technology.

The second EC technology is used for storing, based on a redundancy ratio corresponding to the second EC technology, data blocks received by the storage system after the first EC technology is updated to the second EC technology. A quantity S of data blocks in the redundancy ratio (EC S+R) corresponding to the second EC technology is greater than a quantity N of data blocks in the redundancy ratio (EC N+M) corresponding to the first EC technology, and a ratio of S to R is greater than a ratio of N to M.

Similar to the foregoing description of the first EC technology, the second EC technology in this embodiment of this disclosure may be understood as an EC technology for calculating check blocks of data blocks based on a redundancy ratio (that is, EC S+R) corresponding to the second EC technology. When the check blocks of the data blocks are calculated by using the second EC technology with the redundancy ratio of EC S+R, a redundancy relationship in which the S data blocks correspond to the R check blocks is generally used for performing data redundancy. However, in some cases, for example, if a specific storage node in the storage system is faulty, when the check blocks of the data blocks are calculated by using the second EC technology, data redundancy processing may alternatively be performed based on a redundancy relationship with fewer data blocks (for example, (S−1) data blocks correspond to R check blocks, or (S−2) data blocks correspond to R check blocks). However, due to constraint of the redundancy ratio EC S+R, data redundancy processing is not performed based on a redundancy relationship with more data blocks (for example, (S+1) data blocks correspond to R check blocks, or (S+2) data blocks correspond to R check blocks).

In other words, as described in the foregoing description of the related technology, in a scenario in which a storage system is expanded, to improve capacity utilization, a manner of reconstructing a storage system during capacity expansion may be used. This manner has problems of a complex expansion process, a high requirement on a quantity of newly added hardware, and a need to borrow storage space for temporary storage. In addition, a manner in which a redundancy ratio of more data blocks and check blocks is used when the storage system is constructed, and in subsequent capacity expansion, a quantity of data blocks in the redundancy ratio is kept unchanged and a quantity of check blocks in the redundancy ratio of fewer check blocks is based may be used, in this manner, a redundancy ratio of more data blocks and check blocks needs to be used when a storage system is constructed, and therefore, a process of constructing the storage system is complex. In other words, in the related technology, to reduce complexity of a capacity expansion process, an EC technology used by the storage system is generally not updated to an EC technology with a larger quantity of data blocks in a running process of the storage system. However, in this disclosure, this technical bias may be broken. When the storage system is expanded, a technical means of directly updating the EC technology of the storage system to the second EC technology is used, so that capacity utilization of the storage system is improved. However, for the problem of complex capacity expansion process, another technical means may be used to resolve the problem based on updating the EC technology of the storage system to the second EC technology. For example, as described below, an EC technology used for previous data (that is, data stored in the storage system before the EC technology is updated) in the capacity expansion process may remain unchanged, so that data migration may not be performed, instead, only EC metadata is migrated when necessary (for example, when primary nodes of the storage system change, the EC metadata of the previous data is migrated to new primary nodes). In an aspect, if data needs to be read in this case, the data is read in a manner of reading previous data by using the first EC technology and reading data stored after capacity expansion by using the second EC technology. In another aspect, in a subsequent idle period of the storage system, the second EC technology is used for recalculating and storing check blocks for data blocks that originally use the first EC technology. In this way, a process in which a redundancy ratio of the previous data needs to be changed to a redundancy ratio corresponding to the second EC technology in a capacity expansion process to maintain consistency of a redundancy relationship of stored data can be avoided, so that complexity of the capacity expansion process is reduced. In addition, according to the method provided in embodiments of this disclosure, a corresponding resource can be avoided from being consumed in the capacity expansion process to change the EC technology used for previous data. Therefore, duration of the capacity expansion process can be shortened, and read/write performance of the storage system in the capacity expansion process can be improved.

A specific manner of determining values of S and R in the redundancy ratio EC S+R corresponding to the second EC technology may be set depending on an actual requirement in a specific implementation process. For example, the values of S and R may be manually configured by the operation and maintenance personnel when the storage system is expanded. For another example, in a process of expanding the storage system, the data storage apparatus may determine the values of S and R based on a quantity of storage nodes after expansion. For example, if the storage system includes six storage nodes before capacity expansion, the redundancy ratio corresponding to the first EC technology is EC 4+2, and the storage system includes eight storage nodes after capacity expansion, the data storage apparatus determines, according to a constraint condition related to data reliability or capacity utilization, that the redundancy ratio corresponding to the second EC technology is EC 6+2.

Further, the method may further include the following steps.

S406. The data storage apparatus calculates R check blocks of S second data blocks based on the second EC technology.

The second data block is a data block received after the first EC technology is updated to the second EC technology.

In an implementation, R is not less than M. In this implementation, the quantity R of check blocks in the redundancy ratio of the second EC technology is not less than the quantity M of check blocks in the first EC technology, so that reliability of stored data is ensured.

S407. The data storage apparatus respectively stores the S second data blocks and the R check blocks of the S second data blocks into corresponding storage nodes in (S+R) storage nodes in the storage system.

For example, if the redundancy ratio corresponding to the first EC technology is EC 4+2, and the redundancy ratio corresponding to the second EC technology is EC 6+2, the S second data blocks and the R check blocks of the S second data blocks may be six second data blocks and two check blocks of the six second data blocks. It should be noted that in this example, that R is equal to M (that is, R=M=2) is used for description. In a specific implementation process, R may not be equal to M. This may not be limited in this embodiment of this disclosure. Still continuing to use the example shown in FIG. 5, after the four first data blocks are respectively stored in the node 1, the node 2, the node 3, and the node 7, and the two check blocks of the four first data blocks are respectively stored in the node 5 and the node 8, six second data blocks (that is, a block 7 to a block 12 in the figure) may be respectively stored in the node 1 to the node 6, and two check blocks (that is, a block 13 and a block 14 in the figure) of the six second data blocks are respectively stored in the node 7 and the node 8. That is, in this case, the storage system stores both data stored by using the first EC technology (that is, the block 1 to the block 6) and data stored by using the second EC technology (that is, the block 7 to the block 14).

In an implementation, in the method provided in embodiments of this disclosure, the storage system may simultaneously store data stored by using two (or more) different EC technologies. Therefore, as shown in FIG. 6, the method may further include the following steps.

S408. The data storage apparatus receives a read request.

The read request is used for requesting to read data stored in the storage system.

If the read request is used for requesting to read data in the N first data blocks, S409 is performed. If the read request is used for requesting to read data in the S second data blocks, S410 is performed.

S409. Read the data in the N first data blocks based on the first EC technology.

For example, when the read request is used for requesting to read the data in the N first data blocks, the data storage apparatus reads metadata corresponding to the N first data blocks, to determine storage addresses (which may be physical addresses or logical addresses) of the N first data blocks and the first EC technology used by the N first data blocks. Then, to-be-read data in the N first data blocks is read based on the first EC technology.

S410. Read the data in the S second data blocks based on the second EC technology.

For example, when the read request is used for requesting to read the data in the S second data blocks, the data storage apparatus reads metadata corresponding to the S second data blocks, to determine storage addresses (which may be physical addresses or logical addresses) of the S second data blocks and the second EC technology used by the S second data blocks. Then, to-be-read data in the S second data blocks is read based on the second EC technology.

Figure 7:
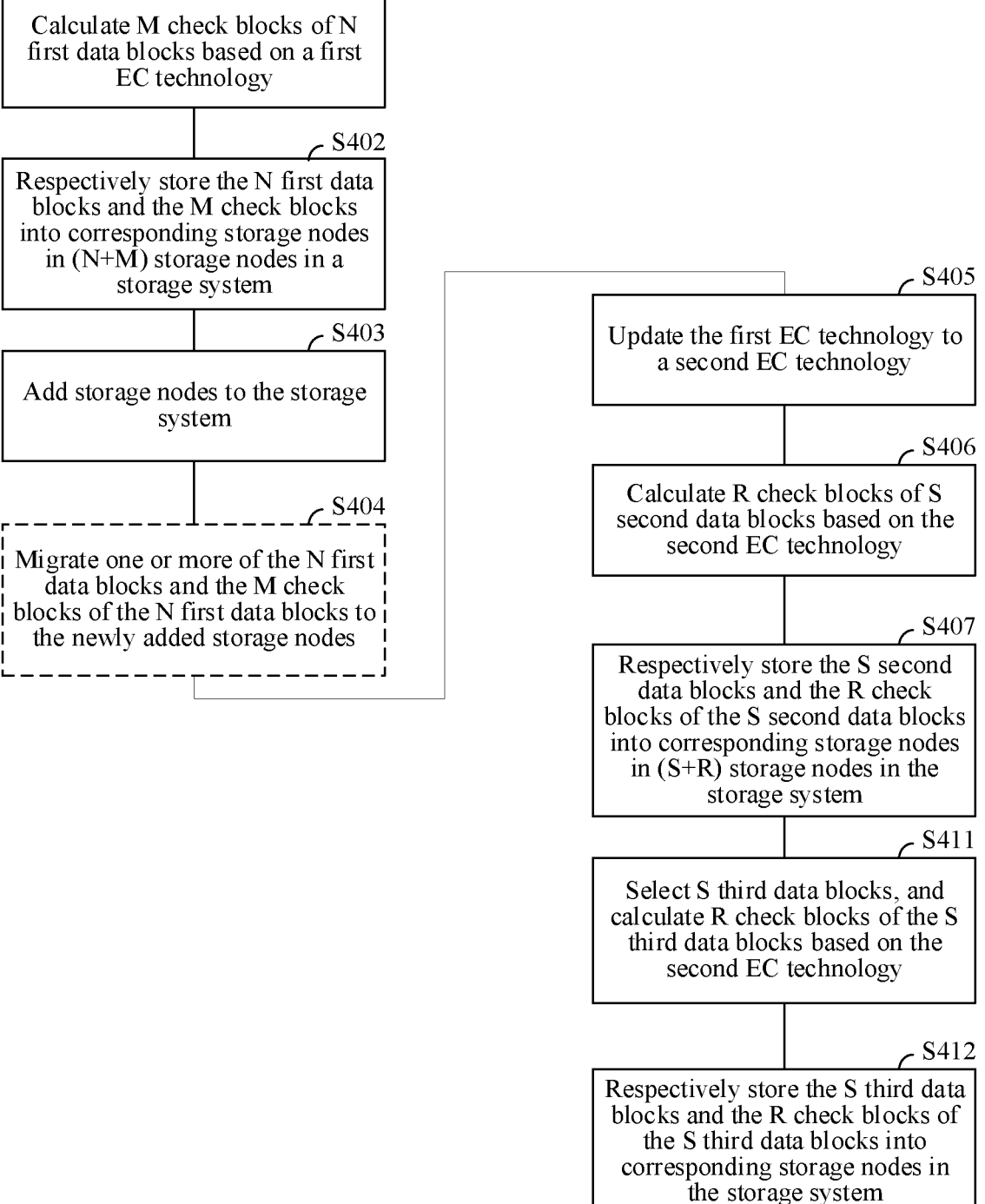
FIG. 7 is a schematic flowchart of a data storage method according to an embodiment of this disclosure.

In addition, in an implementation, to convert data stored in the storage system by using the first EC technology into data stored by using the second EC technology, so as to maintain consistency of a data structure of the storage system, and facilitate management of the data stored in the storage system. As shown in FIG. 7, the method may further include the following steps.

S411. The data storage apparatus selects S data blocks (for ease of description, the S data blocks are referred to as S third data blocks below) from data blocks stored in the storage system based on the first EC technology, and calculates R check blocks of the S third data blocks based on the second EC technology.

For example, in an idle time period of the storage system, S411 may be performed, to convert data stored in the storage system by using the first EC technology into data stored by using the second EC technology, so that consistency of a data structure of the storage system is maintained.

The idle time period of the storage system may also be referred to as a time period in which a running load of the storage system is lower than a load threshold. Further, the idle time period of the storage system may be represented as one or more of the following: current to-be-written data of the storage system is less than a preset threshold (or a "first preset threshold"), current to-be-read data of the storage system is less than a preset threshold (or a "second preset threshold"), or related hardware resource utilization of the storage system is less than a preset threshold (or a "third preset threshold").

S412. The data storage apparatus respectively stores the S third data blocks and the R check blocks of the S third data blocks into corresponding storage nodes in the storage system.

For example, the S third data blocks and the R check blocks of the S third data blocks are respectively stored in (S+R) storage nodes in the storage system.

In the foregoing implementation, in a scenario of expanding a storage system, after an EC technology of the storage system is updated and a redundancy ratio of the used EC technology is changed, an original redundancy relationship may be maintained for previous data (that is, data stored before the EC technology is updated). Then, when the storage system is in an idle time period, the redundancy relationship of the previous data is converted by using the second EC technology. In this way, consistency of the data structure of the storage system can be maintained, and effect of reducing complexity of the capacity expansion process and balancing loads of the storage system can be achieved.

In addition, when a delete operation is performed on the previous data in the storage system, the storage system may also reclaim storage space occupied by data stored based on the first EC technology, and then store data into the storage space based on the second EC technology, so that capacity utilization of the storage system is further improved.

The foregoing mainly describes the method provided in embodiments of this disclosure by using a scenario in which a storage system is expanded. In an actual application process, this disclosure may also be used in another scenario, for example, a scenario in which a redundancy ratio of a first EC technology that is initially configured in a storage system is inappropriate, and a second EC technology is more appropriate. Therefore, as shown in FIG. 8, the data storage method provided in embodiments of this disclosure may further include the following steps.

S501. A data storage apparatus calculates M check blocks of N first data blocks based on a first EC technology.

For a specific implementation process of S501, refer to corresponding content of S401. Details are not described herein again.

S502. The data storage apparatus respectively stores the N first data blocks and the M check blocks into (N+M) storage nodes in the storage system.

For a specific implementation process of S502, refer to corresponding content of S402. Details are not described herein again.

S503. The data storage apparatus updates the first EC technology to a second EC technology.

In other words, different from the method described in FIG. 4, FIG. 6, or FIG. 7, this method may not be applied to a storage system capacity expansion scenario, but may directly update an EC technology of the storage system, so that the storage system stores, based on the second EC technology, data received after the update.

S504. The data storage apparatus calculates R check blocks of S second data blocks based on the second EC technology.

For a specific implementation process of S504, refer to corresponding content of S406. Details are not described herein again.

S505. The data storage apparatus respectively stores the S second data blocks and the R check blocks of the S second data blocks into (S+R) storage nodes in the storage system.

For a specific implementation process of S505, refer to corresponding content of S407. Details are not described herein again.

In addition, it may be understood that, in a scenario in which, for example, the redundancy ratio of the first EC technology that is initially configured in the storage system is inappropriate and the second EC technology is more inappropriate, the data in the storage system may be read in a manner similar to that in S408 to S410. In addition, the data stored based on the first EC technology may be converted into the data stored based on the second EC technology in a manner similar to that in S411 and S412. In other words, the method procedures provided in this disclosure may be associated with each other, and may be mutually referenced or quoted.

In addition, in embodiments of this disclosure, the data storage apparatus may perform some or all of the steps in embodiments of this disclosure, and these steps or operations are merely examples. In embodiments of this disclosure, other operations or variations of various operations may be further performed. In addition, the steps may be performed in different sequences presented in embodiments of this disclosure, and not all the operations in embodiments of this disclosure may need to be performed.

It may be understood that, to implement functions in the foregoing embodiments, the data storage apparatus includes corresponding hardware structures and/or software modules for performing the functions. A person skilled in the art should be easily aware that, in combination with the units and the method steps in the examples described in embodiments disclosed in this disclosure, this disclosure can be implemented through hardware or a combination of hardware and computer software. Whether a function is executed through hardware or hardware driven by computer software depends on particular application scenarios and design constraint conditions of the technical solutions.

FIG. 9 is a schematic diagram of a structure of another data storage apparatus according to this disclosure. A data storage apparatus 600 may be configured to implement functions of steps in the foregoing method embodiments. Therefore, beneficial effects of the foregoing method embodiments can also be implemented. In this embodiment of this disclosure, the data storage apparatus 600 may be a storage server that has a management and control function in the distributed storage system shown in FIG. 2 or some hardware inside the storage server. For another example, the data storage apparatus may be a storage engine in a centralized storage system or some hardware inside the storage engine.

As shown in FIG. 9, the data storage apparatus 600 includes a processing unit 601, a read/write unit 602, and a receiving unit 603. The data storage apparatus 600 is configured to implement functions of steps in the method embodiments shown in FIG. 4 or FIG. 6 to FIG. 8.

For example, when the data storage apparatus 600 is configured to implement the method shown in FIG. 4, the processing unit 601 is configured to perform one or more of S401, S403, S405, or S406, and the read/write unit 602 is configured to perform one or more of S402, S404, or S407.

For another example, when the data storage apparatus 600 is configured to implement the method shown in FIG. 6, the receiving unit 603 is configured to perform S408, and the read/write unit 602 is further configured to perform one or more of S409 or S410.

For another example, when the data storage apparatus 600 is configured to implement the method shown in FIG. 7, the processing unit 601 is further configured to perform S411, and the read/write unit 602 is further configured to perform S412.

For another example, when the data storage apparatus 600 is configured to implement the method shown in FIG. 8, the processing unit 601 is configured to perform one or more of S501, S503, or S504, and the read/write unit 602 is configured to perform one or more of S502 or S505.

For more detailed descriptions of the processing unit 601, the read/write unit 602, and the receiving unit 603, directly refer to related descriptions in the method embodiments shown in FIG. 4 or FIG. 6 to FIG. 8. Details are not described herein again.

The method steps in embodiments of this disclosure may be implemented in a hardware manner, or may be implemented by executing software instructions by a processor. The software instructions include a corresponding software module. The software module may be stored in a RAM, a flash memory, a ROM, a PROM, an EPROM, an EEPROM, a register, a hard disk, a removable hard disk, a CD-ROM, or a storage medium of any other form known in the art. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be located in a network device or a terminal device. Certainly, the processor and the storage medium may exist in the network device or the terminal device as discrete components.

All or some of the foregoing embodiments may be implemented by using software, hardware, firmware, or any combination thereof. When software is used to implement embodiments, all or a part of embodiments may be implemented in a form of a computer program product. The computer program product includes one or more computer programs and instructions. When the computer programs or instructions are loaded and executed on a computer, all or some of the procedures or functions in embodiments of this disclosure are executed. The computer may be a general-purpose computer, a dedicated computer, a computer network, a network device, user equipment, or another programmable apparatus. The computer programs or instructions may be stored in a computer-readable storage medium, or may be transmitted from a computer-readable storage medium to another computer-readable storage medium. For example, the computer programs or instructions may be transmitted from a web site, computer, server, or data center to another website, computer, server, or data center in a wired manner or in a wireless manner. The computer-readable storage medium may be any usable medium accessible by a computer, or a data storage device, such as a server or a data center, integrating one or more usable media. The usable medium may be a magnetic medium, for example, a floppy disk, a hard disk, or a magnetic tape, or may be an optical medium, for example, a DVD, or may be a semiconductor medium, for example, an SSD.

In embodiments of this disclosure, unless otherwise stated or there is a logic conflict, terms and/or descriptions between different embodiments are consistent and may be mutually referenced, and technical features in different embodiments may be combined based on an internal logical relationship thereof, to form a new embodiment.

In this specification, the claims, and the accompanying drawings of this disclosure, the terms "first", "second", "third", and the like are intended to distinguish between different objects but do not limit a particular order. In addition, in embodiments of this disclosure, the terms such as "example" or "for example" is used to represent giving an example, an illustration, or a description. Any embodiment or design scheme described as an "example" or "for example" in embodiments of this disclosure should not be explained as being more preferred or having more advantages than another embodiment or design scheme. Exactly, use of the terms such as "example" or "for example" is intended to present a relative concept in a specific manner.

In this disclosure, "at least one" means one or more, "a plurality of" means two or more, and other quantifiers have similar meanings. The term "and/or" describes an association relationship between associated objects and indicates that three relationships may exist. For example, A and/or B may indicate the following three cases: only A exists, both A and B exist, and only B exists. In addition, an element (element) that appears in singular forms "a", "an", and "the" does not mean "one or only one" unless otherwise specified in the context, but means "one or more". For example, "a device" means one or more such devices. Furthermore, "at least one of (at least one of) . . . " means one or any combination of subsequent associated objects. For example, "at least one of A, B, and C" includes A, B, C, AB, AC, BC, or ABC. In the text descriptions of this disclosure, the character "/" generally indicates an "or" relationship between the associated objects. In a formula in this disclosure, the character "/" indicates a "division" relationship between the associated objects.

It may be understood that various numbers in embodiments of this disclosure are merely used for differentiation for ease of description, and are not used to limit the scope of embodiments of this disclosure. The sequence numbers of the foregoing processes do not mean execution sequences, and the execution sequences of the processes should be determined based on functions and internal logic of the processes.

What is claimed is:

1. A method in a storage system, wherein the method comprises:
   calculating M check blocks of N first data blocks based on a first erasure coding (EC) technology;
   respectively storing the N first data blocks and the M check blocks into first corresponding storage nodes in (N+M) storage nodes in the storage system;
   migrating, after adding first storage nodes to the storage system and without updating the first EC technology, one or more of the N first data blocks and the M check blocks to the first storage nodes;
   updating the first EC technology to a second EC technology, wherein prior to the updating, the storage system is configured with the first EC technology and not the second EC technology;
   receiving S second data blocks after updating the first EC technology to the second EC technology;
   calculating R first check blocks of the S second data blocks based on the second EC technology, wherein S is greater than N, wherein a first ratio of S to R is greater than a second ratio of N to M, and wherein S, R, N, and M are positive integers; and
   respectively storing the S second data blocks and the R first check blocks into second corresponding storage nodes in (S+R) storage nodes in the storage system.

2. The method of claim 1, further comprising:
   selecting S target data blocks from third data blocks stored in the storage system based on the first EC technology;
   calculating R second check blocks of the S target data blocks based on the second EC technology; and
   respectively storing the S target data blocks and the R second check blocks into third corresponding storage nodes in the storage system.

3. The method of claim 1, wherein R is greater than or equal to M.

4. The method of claim 1, further comprising:
   receiving a read request;
   reading first data in the N first data blocks based on the first EC technology when the read request requests to read the first data; and
   reading second data in the S second data blocks based on the second EC technology when the read request requests to read the second data.

5. The method of claim 1, wherein each of and the (S+R) storage nodes is any one of a storage drive, a disk enclosure, or a storage server.

6. The method of claim 1, further comprising:
   receiving a data access request for one or more data blocks;
   reading metadata corresponding to the one or more data blocks, wherein the metadata indicates which of the first EC technology and the second EC technology is associated with the one or more data blocks; and
   accessing the one or more data blocks based on the one of the first EC technology and the second EC technology indicated by the metadata.

7. The method of claim 2, wherein the S target data blocks are selected after updating the first EC technology to the second EC technology and during an idle time period of the storage system, and wherein the idle time period comprises at least one of a time period in which a running load of the storage system is lower than a load threshold, current to-be-written data of the storage system being less than a first preset threshold, current to-be-read data of the storage system being less than a second preset threshold, or hardware resource utilization of the storage system being less than a third preset threshold.

8. A storage apparatus comprising:
a memory configured to store programming instructions; and
at least one processor coupled to the memory and configured to execute the programming instructions to cause the storage apparatus to:
calculate M check blocks of N first data blocks based on a first erasure coding (EC) technology;
respectively store the N first data blocks and the M check blocks into first corresponding storage nodes in (N+M) storage nodes in a storage system;
migrate, after adding first storage nodes to the storage system and without updating the first EC technology, one or more of the N first data blocks and the M check blocks to the first storage nodes;
update the first EC technology to a second EC technology, wherein prior to the updating, the storage system is configured with the first EC technology and not the second EC technology;
receive S second data blocks after updating the first EC technology to the second EC technology;
calculate R first check blocks of the S second data blocks based on the second EC technology, wherein S is greater than N, wherein a first ratio of S to R is greater than a second ratio of N to M, and wherein S, R, N, and M are positive integers; and
respectively store the S second data blocks and the R first check blocks into second corresponding storage nodes in (S+R) storage nodes in the storage system.

9. The storage apparatus of claim 8, wherein the at least one processor is further configured to execute the programming instructions to cause the storage apparatus to:
select S target data blocks from third data blocks stored in the storage system based on the first EC technology;
calculate R second check blocks of the S target data blocks based on the second EC technology; and
respectively store the S target data blocks and the R second check blocks into third corresponding storage nodes in the storage system.

10. The storage apparatus of claim 8, wherein R is greater than or equal to M.

11. The storage apparatus of claim 8, wherein the at least one processor is further configured to execute the programming instructions to cause the storage apparatus to:
receive a read request;
read first data in the N first data blocks based on the first EC technology when the read request requests to read the first data; and
read second data in the S second data blocks based on the second EC technology when the read request requests to read the second data.

12. The storage apparatus of claim 8, wherein each of the (N+M) storage nodes and the (S+R) storage nodes is any one of a storage drive, a disk enclosure, or a storage server.

13. The storage apparatus of claim 8, wherein the at least one processor is further configured to execute the programming instructions to cause the storage apparatus to:
receive a data access request for one or more data blocks;
read metadata corresponding to the one or more data blocks, wherein the metadata indicates which of the first EC technology and the second EC technology is associated with the one or more data blocks; and
access the one or more data blocks based on the one of the first EC technology and the second EC technology indicated by the metadata.

14. The storage apparatus of claim 9, wherein the at least one processor is further configured to further select the S target data blocks after updating the first EC technology to the second EC technology and during an idle time period of the storage system, and wherein the idle time period comprises at least one of a time period in which a running load of the storage system is lower than a load threshold, current to-be-written data of the storage system being less than a first preset threshold, current to-be-read data of the storage system being less than a second preset threshold, or hardware resource utilization of the storage system being less than a third preset threshold.

15. A computer program product comprising computer-executable instructions that are stored on a non-transitory computer-readable medium and that, when executed by at least one processor, cause a storage apparatus to:
calculate M check blocks of N first data blocks based on a first erasure coding (EC) technology;
respectively store the N first data blocks and the M check blocks into first corresponding storage nodes in (N+M) storage nodes in a storage system;
migrate, after adding first storage nodes to the storage system and without updating the first EC technology, one or more of the N first data blocks and the M check blocks to the first storage nodes;
update the first EC technology to a second EC technology, wherein prior to the updating, the storage system is configured with the first EC technology and not the second EC technology;
receive S second data blocks after updating the first EC technology to the second EC technology;
calculate R first check blocks of the S second data blocks based on the second EC technology, wherein S is greater than N, wherein a first ratio of S to R is greater than a second ratio of N to M, and wherein S, R, N, and M are positive integers; and
respectively store the S second data blocks and the R first check blocks into second corresponding storage nodes in (S+R) storage nodes in the storage system.

16. The computer program product of claim 15, wherein the computer-executable instructions further cause the storage apparatus to:
select S target data blocks from third data blocks stored in the storage system based on the first EC technology;
calculate R second check blocks of the S target data blocks based on the second EC technology; and
respectively store the S target data blocks and the R second check blocks into third corresponding storage nodes in the storage system.

17. The computer program product of claim 15, wherein R is greater than or equal to M.

18. The computer program product of claim 15, wherein the computer-executable instructions further cause the storage apparatus to:
receive a read request;

read first data in the N first data blocks based on the first EC technology when the read request requests to read the first data; and read second data in the S second data blocks based on the second EC technology when the read request requests to read the second data.

19. The computer program product of claim 15, wherein when executed by the at least one processor, the computer-executable instructions further cause the storage system to:

receive a data access request for one or more data blocks;

read metadata corresponding to the one or more data blocks, wherein the metadata indicates which of the first EC technology and the second EC technology is associated with the one or more data blocks; and access the one or more data blocks based on the one of the first EC technology and the second EC technology indicated by the metadata.

20. The computer program product of claim 16, wherein when executed by the at least one processor, the computer-executable instructions further cause the storage system to further select the S target data blocks after updating the first EC technology to the second EC technology and during an idle time period of the storage system, and wherein the idle time period comprises at least one of a time period in which a running load of the storage system is lower than a load threshold, current to-be-written data of the storage system being less than a first preset threshold, current to-be-read data of the storage system being less than a second preset threshold, or hardware resource utilization of the storage system being less than a third preset threshold.

\* \* \* \* \*